March 7, 1944.　　　T. IAVELLI　　　2,343,298
TRANSMISSION CONTROL
Filed Aug. 19, 1942　　　5 Sheets-Sheet 3

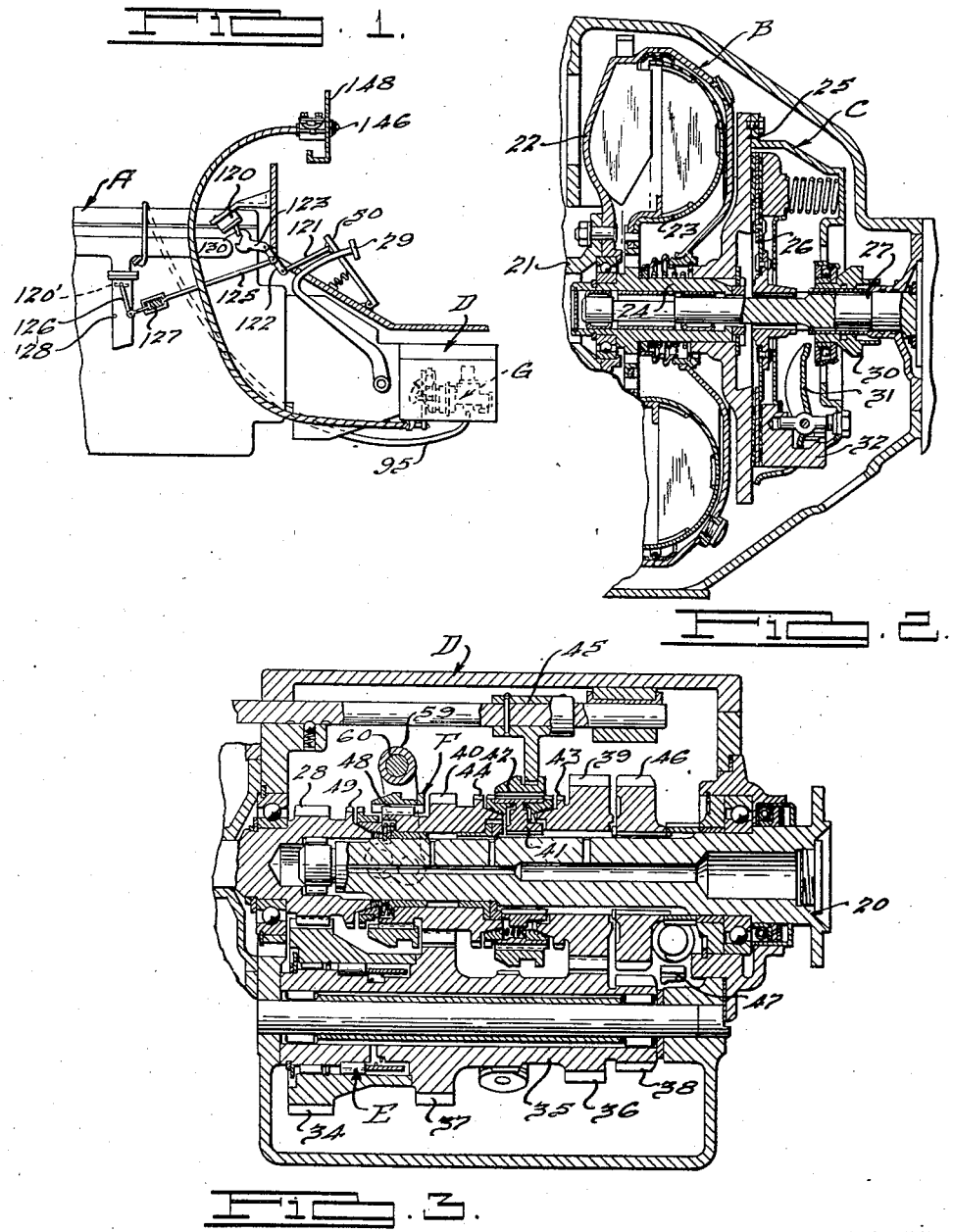

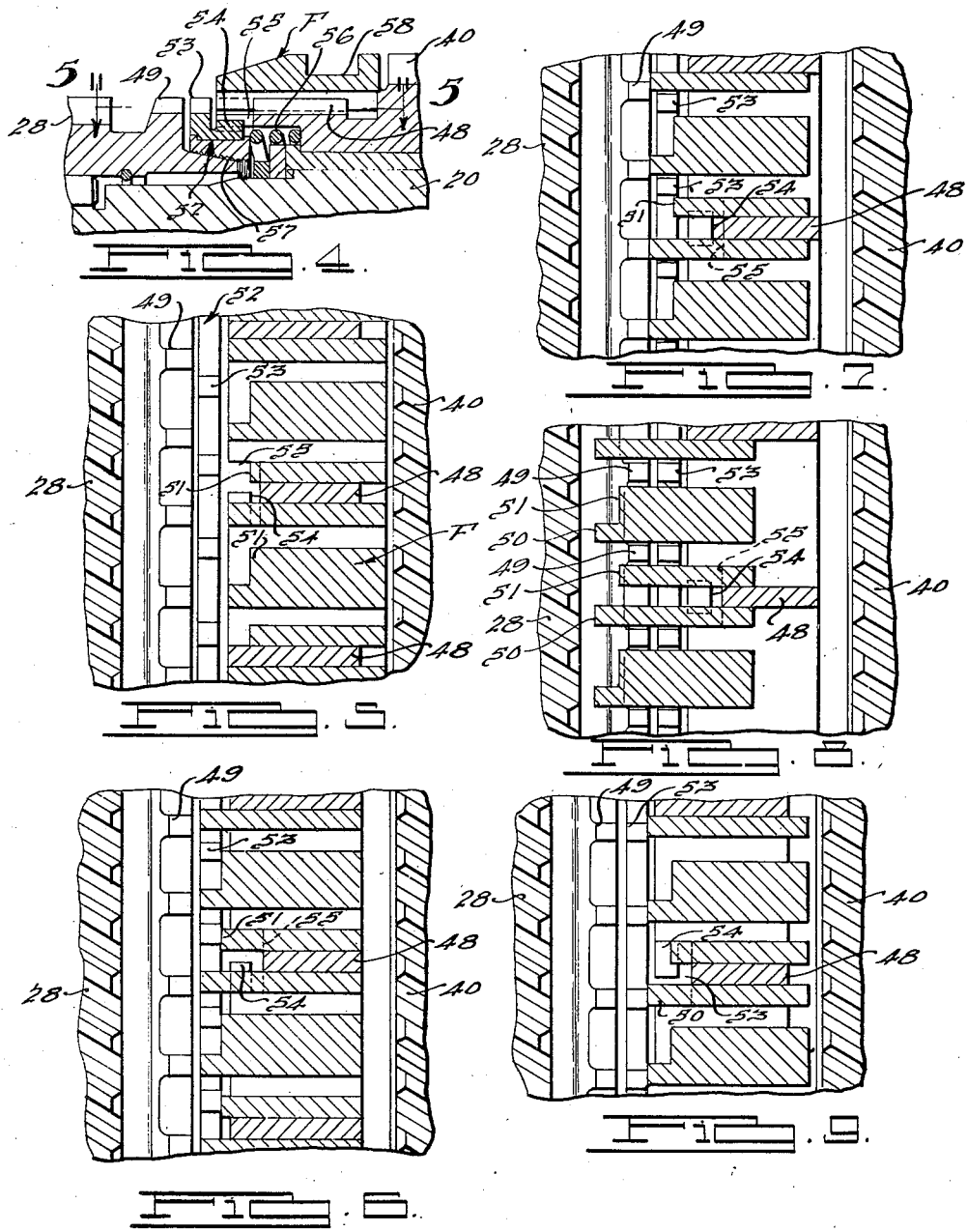

INVENTOR
Teno Iavelli.
BY Harness, Dind, Patee & Harris
ATTORNEYS.

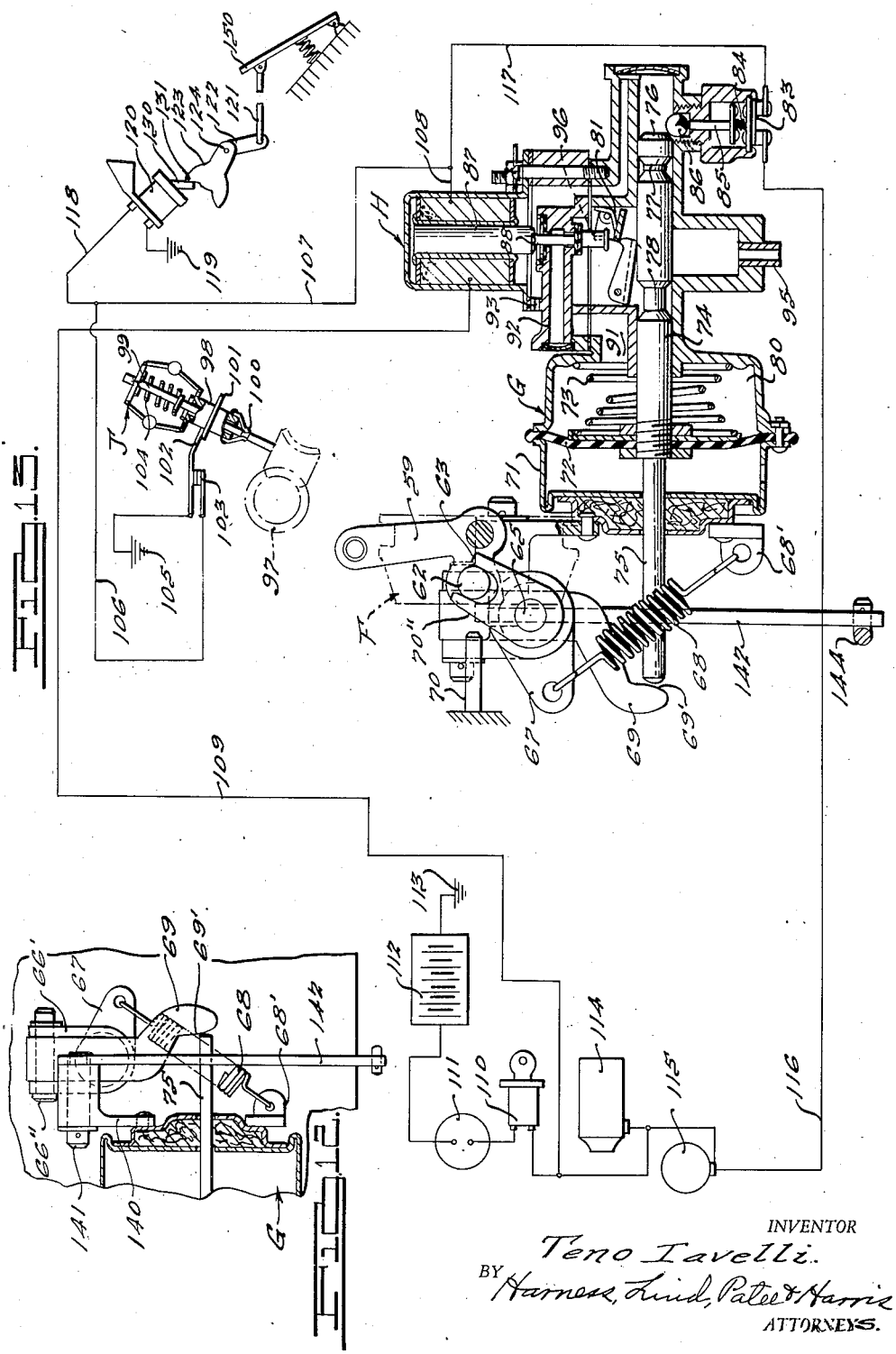

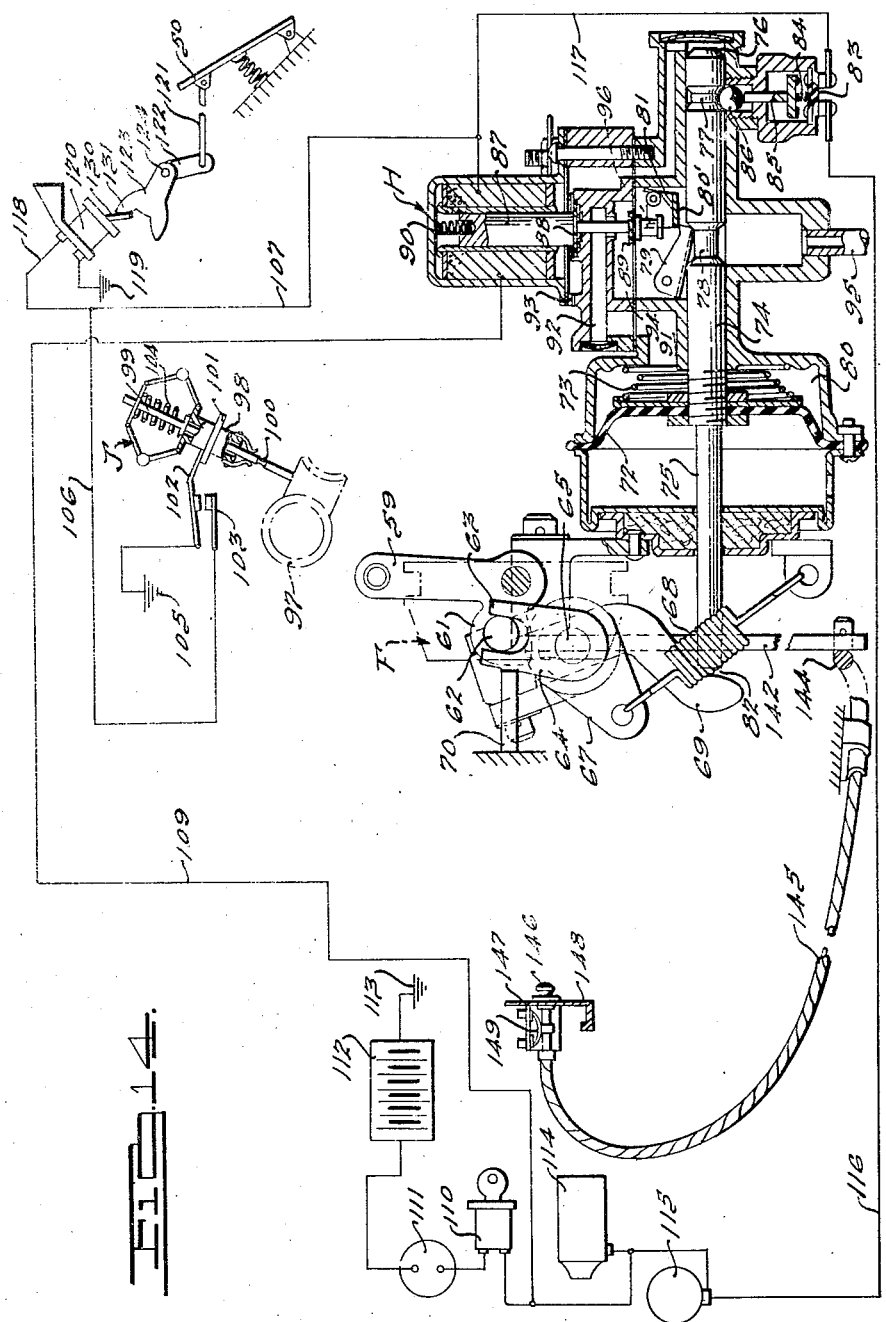

Patented Mar. 7, 1944

2,343,298

UNITED STATES PATENT OFFICE 2,343,298

TRANSMISSION CONTROL

Teno Iavelli, Detroit, Mich., assignor to Chrysler Corporation, Highland Park, Mich., a corporation of Delaware Application August 19, 1942, Serial No. 455,279

20 Claims. (Cl. 74—335)

This invention relates to motor vehicles and refers more particularly to power transmission and control mechanism therefor.

My invention has particular reference to improvements in transmissions of the general character illustrated in the copending application of Carl A. Neracher et al., Serial No. 335,310, filed May 15, 1940.

It is an object of the invention to provide an improved arrangement of control parts, especially the mechanism for controlling shift of the synchronously engaging clutching sleeve, whereby the parts are more compactly arranged, provide more positive and direct operation of thrust transmission, and accommodate installation where interference with other parts of the motor vehicle are less likely.

Another object of my invention is to provide a sleeve operating motor which is capable of assembly at the transmission itself, together with a novel system of operating linkage between the motor and drive controlling sleeve.

A further object of my invention is to provide an improved arrangement for controlling manual shift of the automatic clutching sleeve.

Further objects and advantages of my invention will be more apparent from the following illustrative embodiments thereof, reference being had to the accompanying drawings in which:

Fig. 1 is a side elevational view showing a motor vehicle engine and power transmission equipped with my invention.

Fig. 2 is a longitudinal sectional elevational view through the main clutching mechanism.

Fig. 3 is a similar view through the change speed transmission.

Fig. 4 is a detail enlarged view of the blocker sleeve and associated parts as seen in Fig. 3.

Fig. 5 is a sectional plan view illustrated as a development according to line 5—5 of Fig. 4, the automatic clutching sleeve being released.

Fig. 6 is a similar view showing the automatic clutching sleeve in its intermediate shift position during the driving blocking condition.

Fig. 7 is a similar view showing the automatic clutching sleeve in its coasting relationship from the Fig. 6 showing, the clutching sleeve being unblocked during coast for its clutching movement.

Fig. 8 is a similar view showing the automatic clutching sleeve in full clutching engagement.

Fig. 9 is a view similar to Fig. 5 but showing the automatic clutching sleeve in its other intermediate shift position during the coast blocking condition.

Fig. 12 is an end elevational view partly in section of a portion of the transmission and showing the Fig. 10 motor assembly, the view being taken along line 11—11 of Fig. 10.

Fig. 13 is a diagrammatic view of the control mechanism for the automatic clutching sleeve, the latter being shown in its released position.

Fig. 14 is a similar view of the control mechanism in another operating position, the automatic clutching sleeve being engaged.

Figure 10:
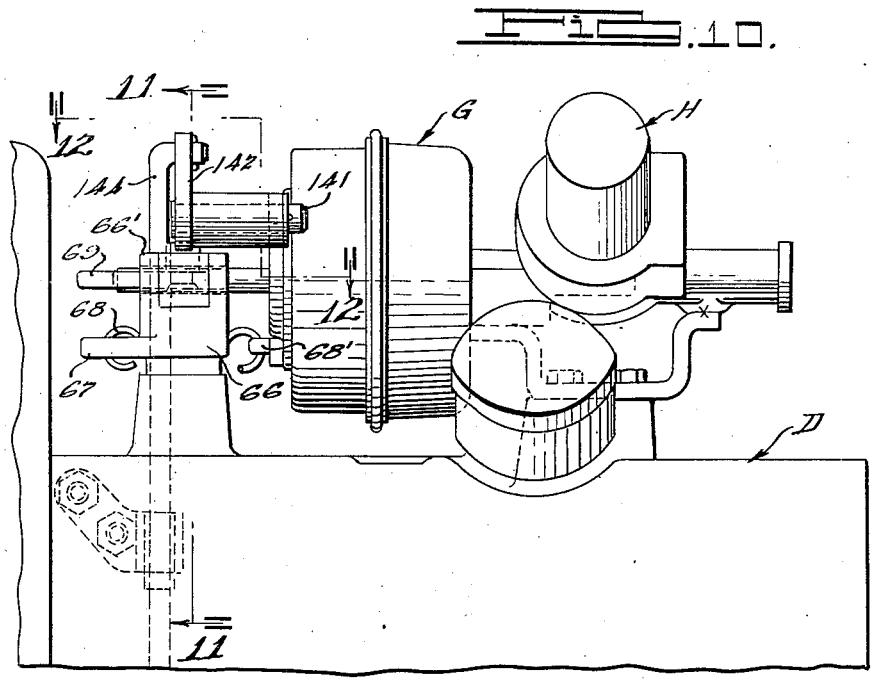
Fig. 10 is a top plan view of a portion of the transmission showing the sleeve-operating motor assembly and associated parts.

While my control may be employed in conjunction with various types and arrangements of motor vehicle transmissions, in order to illustrate one driving system I have shown my invention in connection with certain salient parts of the aforesaid Neracher et al. application.

In the drawings A represents the internal combustion engine which drives through fluid coupling B and conventional type of friction main clutch C to the speed ratio transmission D whence the drive passes from output shaft 20 to drive the rear vehicle wheels in the usual manner.

The engine crankshaft 21 carries the vaned fluid coupling impeller 22 which in the well known manner drives the vaned runner 23 whence the drive passes through hub 24 to clutch driving member 25. This member then transmits the drive, when clutch C is engaged as in Fig. 2, through driven member 26 to the transmission driving shaft 27 carrying the main drive pinion 28. A clutch pedal 29 controls clutch C such that when the driver depresses this pedal, collar 30 is thrust forward to cause levers 31 to release the clutch driving pressure plate 32 against springs 33 thereby releasing the drive between runner 23 and shaft 27. The primary function of the main clutch C is to enable the driver to make manual shifts in transmission D.

Referring to the transmission, pinion 28 is in constant mesh with gear 34 which drives countershaft cluster 35 through an overrunning clutch E of the usual type such that when shaft 27 drives in its usual clockwise direction (looking from front to rear) then clutch E will engage to lock gear 34 to countershaft cluster 35 whenever the gear 34 tends to drive faster than the counter shaft. However, whenever this gear 34 tends to rotate slower than the countershaft then clutch E will automatically release whereby shaft 27, under certain conditions, may readily drop its speed while countershaft cluster 35 continues to revolve.

Countershaft cluster 35 comprises cluster gears 36, 37 and 38 which respectively provide drives in first, third and reverse. Freely rotatable on shaft 20 are the first and third driven gears 39 and 40 respectively in constant mesh with countershaft gears 36 and 37. A hub 41 is splined on shaft 20 and carries therewith a manually shiftable sleeve 42 adapted to shift from the Fig. 3 neutral position either rearwardly to clutch with teeth 43 of gear 39 or else forwardly to clutch with teeth 44 of gear 40. Sleeve 42 is operably connected to shift rail 45 adapted for operation by any suitable means under shifting control of the vehicle driver.

Shaft 20 also carries reverse driven gear 46 fixed thereto. A reverse idler gear 47 is suitably mounted so that when reverse drive is desired, idler 47 is shifted into mesh with gears 38 and 46.

First, third and reverse speed ratio drives and neutral are under manual shift control of the vehicle driver when starting the vehicle from rest, the main clutch C being released by depressing pedal 29 in shifting into any one of these drives.

First is obtained by shifting sleeve 42 to clutch with teeth 43, the drive passing from engine A, through fluid coupling B, clutch C and shaft 27 to pinion 28 thence through gear 34 and clutch E to countershaft 35. From the countershaft the drive is through gears 36, 39 and sleeve 42 to shaft 20.

Third is obtained by shifting sleeve 42 to clutch with teeth 44, the drive passing from the engine to the countershaft 35 as before, thence through gears 37, 40 and sleeve 42 to shaft 20.

Reverse is obtained by shifting idler into mesh with gears 38, 46, sleeve 42 being in neutral, the reverse drive passing from the engine to the countershaft 35 as before, thence through gears 38, 47 and 46 to shaft 20.

Slidably splined on teeth 48 carried by gear 40 is the automatic clutching sleeve F which, under certain conditions, is adapted to shift forwardly to clutch with teeth 49 carried by pinion 28 thereby positively clutching shaft 27 directly to gear 40. This sleeve F is adapted to step-up the speed ratio drive from first to second and from third to fourth which is a direct drive speed ratio. Control means is provided which limits clutching of sleeve F to approximate synchronism with teeth 49 and also to a condition of engine coast, sleeve F being prevented from clutching during that condition known as engine drive as when the engine is being speeded up under power.

When driving in first, second is obtained by the driver releasing the usual accelerator pedal 50 thereby closing the engine throttle valve and allowing the engine to rapidly coast down. When this occurs, the engine along with shaft 27, pinion 28 and gear 34 all slow down while shaft 20 along with gears 39 and 36 continue their speeds by accommodation of clutch E which now overruns. The engine slows down until teeth 49 are brought to approximate synchronism with sleeve F which thereupon automatically shifts to clutch with teeth 49 resulting in a two-way drive for second as follows: pinion 28 through sleeve F to gear 40 thence through gears 37, 36 and 39 to sleeve 42 and shaft 20, the clutch E overrunning.

When driving in third, fourth or direct is obtained just as for second by driver release of the accelerator pedal and resulting shift of sleeve F to clutch with teeth 49 when these parts are synchronized by reason of the engine coasting down from the drive in third. The direct drive is a two-way drive as follows: pinion 28 through sleeve F to gear 40 thence directly through sleeve 42 to shaft 20, clutch E overrunning as before.

Referring to Figs. 4 to 9 there is shown the blocking means for controlling clutching shift of sleeve F so as to limit clutching thereof to engine coasting and synchronous relationship of the clutching parts. Sleeve F is provided with a series of pairs of what may be termed long and short teeth 50, 51 certain of which may be bridged or joined together. A blocker ring 52 is provided with blocking teeth 53 which either lie in the path of forward shift of teeth 50 or 51 or else between these teeth to allow clutching shift of sleeve F. Thus, blocker 52 has, at suitable locations, a drive lug 54 engaged in a slot 55 of gear 40. The blocker is urged under light energizing pressure of spring 56 into constant frictional engagement at 57 with gear 49 so that the blocker tends to rotate with gear 49 within the limits afforded by the travel of lug 54 circumferentially in slot 55.

During drive in first and third, the speed of shaft 27 exceeds the speed of gear 40 so that, if sleeve F is fully released, the parts will be positioned as in Fig. 5 wherein the blocker leads the sleeve F thereby positioning blocker teeth 53 axially in alignment with the short teeth 51. If now the sleeve F is urged forwardly it will move to the Fig. 6 position of drive blocking and will remain in this blocked position as long as the engine drives the car in first or third.

If now the driver releases the accelerator pedal so that the engine may coast down under accommodation of overrunning clutch E, while sleeve F is urged forwardly, then when gear 49 is reduced in speed to that of sleeve F slight further drop in speed of gear 49 for a fraction of a revolution below the speed of sleeve F will cause blocker 52 to rotate slightly relative to sleeve F until blocker teeth 53 strike the adjacent sides of long teeth 50 as in Fig. 7 thereby limiting further reduction in speed of the blocker relative to sleeve F. At this time the sleeve F is free to complete its forward clutching shift with teeth 49, as in Fig. 8, the blocker teeth 53 passing between adjacent long and short teeth 50, 51. With the sleeve F thus clutched during engine coast, a two-way drive is established in second or fourth depending on whether the manually shiftable sleeve 42 was set for first or third just prior to the clutching shift of sleeve F.

In the event that sleeve F is urged forwardly from its Fig. 5 position at a time when the gear 40 is rotating faster than pinion 28, then the blocker 52 will lag behind the sleeve and will be blocked by engagement of long teeth 50 with the blocker teeth 53 as shown in Fig. 9. This is referred to as the coast blocking condition. If now the engine is speeded up by the driver depressing the accelerator pedal in the usual manner, then the engine and blocker 52 rotate forwardly and blocker teeth 53 move over to the Fig. 6 drive blocking position thereby jumping the gap between teeth 50 and 51. This is the primary reason for providing the long and short teeth whereby sleeve F clutches only from the drive blocking condition followed by engine coast which protects the teeth and avoids harsh clutching effects on the passengers and transmission mechanism.

On accelerating the engine from the Fig. 9 coast blocking condition, the engine comes up to a speed limited by engagement of the overrunning clutch E for drive in either first or third depending on the setting of the manually shiftable sleeve 42. Then on releasing the accelerator pedal the sleeve F will synchronously clutch with teeth 49 during coast to step-up the drive to either second or fourth as aforesaid.

The transmission is provided with suitable motor means for controlling shift of sleeve F along with several control means. Referring particularly to Figs. 10 to 14 there is illustrated a pressure fluid operated motor G utilizing air pressure for its operation. For convenience this motor is arranged to operate by the "vacuum" in the intake manifold system of the engine under control of electromagnetic means illustrated in the form of a solenoid H.

Figure 11:
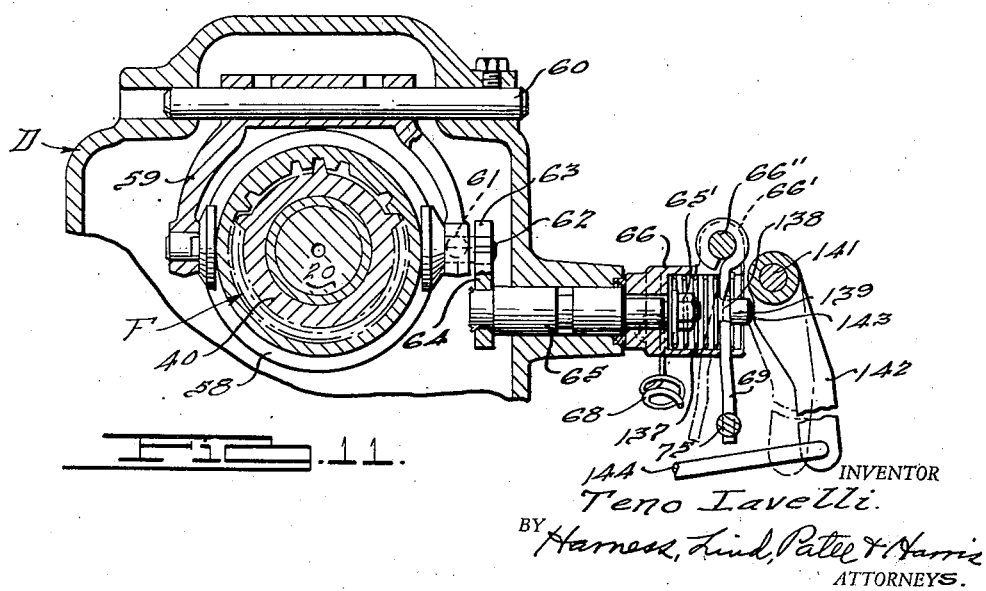
Fig. 11 is a transverse elevational view through the transmission along line 11—11 of Fig. 10 showing the linkage for shifting the clutching sleeve.

Sleeve F is provided with a shift groove 58 engaged as shown in Fig. 11 by the depending arms of a yoke 59 secured to a rock shaft 60 which has its ends rotatably supported in the housing of transmission D. One arm of yoke 59 has a forward lever extension 61 carrying a pin 62 which is engaged by the forked end portion 63 of a lever 64 fixed to the inner end of a rockshaft 65. This rockshaft has an outer end extending outside the transmission casing where it carries an elongated collar 66 which has an integrally formed boss 66' and an integrally formed lever extension 67. The collar 66 is non-rotatably secured to the reduced outer end of the rock shaft 65 by a nut 65' and a tension spring 68 is secured to the lever 67 and a bracket 68' carried on the unit G such that the rock shaft 65 is continuously urged to rotate clockwise as seen in Fig. 12 and counter-clockwise as seen in Figs. 13 and 14.

Pivoted on the boss 66' by means of a pin 66'' for transverse swinging thereabout is a lever 69. A coiled compression spring 137 disposed in the hollow bore of the collar 66 bears against the lever 69, the outward swing of which is limited by a snap ring 138. The lever 69 carries a pin 139 positioned on the lever on an extension of the axis of the rock shaft 65 for a purpose to be made clear.

Pivotally attached to the motor unit G by means of a bracket 140 and pin 141 is a lever 142. This lever is adapted for transverse swinging about the pin 141 and has a cam 143 formed on one side thereof in such position that it is adapted to engage the pin 139 upon clockwise swinging of the lever as viewed in Fig. 11. The lower end of the lever 142 is secured by means of a link 144 to a Bowden cable 145, the upper end of which terminates in a knob 146. A bracket 147 mounts the knob 146 on the vehicle instrument panel 148 for convenient actuation by the driver.

Forward clutching shift of sleeve F is effected, under control of motor G, by the spring 68 exerting a pull on lever 67 in a counterclockwise direction as viewed in Figs. 13 and 14. This rotary motion of lever 67 is transferred through rockshaft 65 and lever 64 to pin 62 thereby thrusting sleeve F forwardly. Forward shift of sleeve F is suitably limited as by stop pin 70 which is fixed to the casing and projects therefrom for engagement by the forward flat face 70'' of the yoke extension 61 when sleeve F is fully clutched as in Fig. 14.

Motor G comprises a casing 71 containing the diaphragm piston 72 urged in a direction to release sleeve F by a spring 73 which is much stronger than the action of spring 68 so that when spring 73 expands, its force will readily stretch spring 67. Diaphragm piston 72 is connected to a leader member in the form of a rod 74 which has a forward extension 75 aligned with the abutment portion 69' of lever 69.

Rod 74 has a series of detents 76, 77 and 78, the latter cooperating with a pivoting latch 79 such that when vacuum is admitted to chamber 80 to cause the piston 72 and rod 74 to assume their Fig. 14 positions, latch 79 under action of pivoted latch-operating part 80' and rat-trap spring 81 catches on the rear shoulder of detent 78 and holds the parts as in Fig. 14. At this time rod portion 75 moves further than lever 69 by the amount of gap 82, the stop 70 acting on yoke extension 61 limiting forward movement of sleeve F by spring 68.

In order to provide for release of sleeve F, it is desirable to provide some means for momentarily relieving the torque load at the teeth 49 and sleeve F and in the present instance I have provided such means as a system of grounding the primary wire of the usual distributer of the ignition system whereby the engine ignition may be momentarily rendered ineffective thereby unloading the torque at sleeve F sufficiently to insure its release by spring 73. This ignition interrupting system is under control of an interrupter switch 83 which is closed against the action of a switch-opening spring 84 by plunger 85 and ball 86 whenever rod 74 moves between the Fig. 14 and Fig. 13 positions by reason of the enlarged rod portion between detents 76, 77. Detent 77 is so arranged that, with the parts as in Fig. 14 and sleeve F clutched, rod 74 may move forwardly sufficiently to close gap 82 at the lost-motion between rod portion 75 and lever 69, this movement causing switch 83 to close and ground the ignition system whereupon spring 73 may then cause further movement of rod 75 to release sleeve F, the switch 83 then opening by detent 76 to restore the ignition system.

The vacuum supply to chamber 80 is under control of solenoid H which comprises an armature plunger 87 having valving parts 88, 89. In Fig. 13 the solenoid H is energized thereby raising plunger 87 against spring 90 to seat valve 89 and shut off the vacuum supply to chamber 80 and at the same time unseat valve 88 so as to vent this chamber through passage 91, chamber 92 and vent passage 93. When the solenoid is de-energized then spring 90 lowers plunger 87 thereby seating valve 88 to shut off vent 93 and open valve 89 as in Fig. 14 thereby opening chamber 80 to the engine intake manifold K through passage 91, chamber 94, and flexible pipe 95.

A certain lost motion is preferably provided between plunger 87 and the inwardly bent finger 96 of latch-operator 80' when in the Fig. 14 position so that when the solenoid H is energized, the plunger 87 strikes the latch-operator and swings it upwardly away from latch 79. The latch 79 is then free to swing upwardly by reason of the relationship between the angle of the shoulder at detent 78 and the pivot point of latch 79, thereby releasing rod 74 for forward movement by spring 73 to release sleeve F. Then when the solenoid is deenergized, the plunger 87 is free to move downwardly allowing the latch 79 to subsequently catch at detent 78 when vacuum operates piston 72, the parts then remaining in the Fig. 14 position independently of vacuum in chamber 80 until solenoid H is again energized to release the latch and vent chamber 80.

It is deemed preferable to provide a speed control on the energization of solenoid H so as to insure automatic release of sleeve F below a predetermined car speed and automatic engagement of sleeve F above a predetermined car speed. Whenever the car is in forward driving condition the manual sleeve 42 is either shifted rearwardly to the low range or forwardly to the high range so that by driving a governor from the countershaft 35 it is possible to provide a speed control operated proportionate to the speed of travel of the car. Driven from countershaft gear 97 is a governor J of any suitable type, this governor operating a sleeve 98 outwardly along its drive shaft 99 as the car speed reaches a predetermined point, the break-away being under control of a detent 100 if desired.

The sleeve 98 has a shoulder 101 engaged by the swinging switch piece 102 of the governor switch 103. When the car is stationary the detent 100 is engaged and switch 103 is closed. As the car accelerates the governor eventually reaches its critical speed and detent 100 releases thereby causing switch 103 to open. As the car slows down, the governor spring 104 restores the parts to the Fig. 13 position and by proportioning the various parts it is obvious that switch 103 may be made to function at desired speeds proportionate to car travel. As an example of one arrangement of governor operation and gearing arrangement, the governor may be made to open switch 103 during car acceleration in first and third respectively at approximately 7 and 15 M. P. H. (miles per hour), the switch 103 closing on stopping the car in direct and second at approximately 7 and 3 M. P. H. respectively.

The governor solenoid circuit under control of switch 103 comprises ground 105 to switch 103 thence through conductors 106, 107 and 108 to solenoid H thence by conductor 109 to ignition switch 110 ammeter 111, battery 112 and ground 113.

In Fig. 13 I have illustrated a portion of the engine ignition circuit which extends from battery 112 and ammeter 111 to ignition switch 110 thence to coil 114 and distributer 115.

The ignition grounding circuit for rendering the ignition momentarily inoperative comprises a grounding conductor 116 extending from the distributer 115 to ignition interrupter switch 83 thence by conductor 117 to conductor 107 which has a branch 118 extending to ground 119 under control of a switch 120 called the kick-down switch because it is controlled by the accelerator pedal 50 when fully depressed to effect step-down in the transmission speed ratio.

The kick-down solenoid circuit extends from ground 119 through switch 120 and conductors 118, 107 and 108 through solenoid H and conductor 109 and thence through ignition switch 110 to ground 113 just as for the governor solenoid circuit.

The kick-down switch 120 is preferably closed when the engine throttle valve 120' (Fig. 1) is fully open. This may be accomplished by arranging the accelerator pedal 50 for a movement overtravelling its wide open throttle position. Pedal 50 operates a link 121 so as to swing bell crank lever 122, 123 about its pivot 124. Lever arm 122 operates link 125 which is connected to throttle valve lever 126 through a lost motion spring 127. Ordinarily this spring affords a solid connection between link 125 and lever 126 but when pedal 50 is depressed to cause lever 126 to engage stop 128 at wide open throttle, then further depression of pedal 50 will cause finger 129 of lever arm 123 to throw arm 130 of switch 120 upwardly thereby closing switch 120, the spring 127 yielding to accommodate this overtravelling movement of the accelerator pedal. When the pedal is released, then finger 131 restores switch 119 to open the kick-down solenoid circuit.

By swinging the lever 142 about its pivot, lever 59 may be misaligned with respect to rod 75 so that the motor is, in effect, rendered inoperative insofar as it has any control on sleeve F. This allows spring 68 to engage sleeve F independently of vacuum and the sleeve, once engaged, will remain engaged as long as the motor remains in its inoperative position. In instances where for any reason the motor G cannot operate, as when it is desired to start a dead engine by towing the car, sleeve F may therefore be engaged under manual control independently of vacuum. If the vacuum system should fail then the manual control on engagement of sleeve F will allow drive in the transmission in second, fourth and reverse by selective manual shift of sleeve 42 or gear 47.

In order to swing the lever 142 about the pivot pin 141 so as to misalign leader rod 75 and follower lever 69, the lever 142 is connected to a Bowden wire mechanism 145 which as seen in Figs. 1 and 14, extends to the operating knob 146 at the usual dash 148 of the vehicle. If desired, a conventional detent or equivalent mechanism 149 may be provided to releasably hold knob 146 when pulled out by the driver. When this knob is pulled, the lever 142 is swung about pivot pin 141 against the restoring force of spring 137 and the lever 69 is swung inwardly, as indicated by the dotted lines in Fig. 11. When in this position the spring 68 is free to engage sleeve F whenever the sleeve is synchronized with the pinion teeth 49 as set forth in the aforesaid Neracher et al. application. When it is desired to restore the transmission to the automatic control of motor G then the operator releases knob 146 and spring 137 will restore lever 69 to the Fig. 11 full line position. If, when the knob 146 is released, the rod 75 is in its projected position, then the rod 75 will overlap lever 69 and lever 69 will not fully return to its full line position under action of spring 137 until the next time that vacuum acts in chamber 80 to retract and latch rod 75. However, knob 146 is allowed to be fully released in advance of restoring the lever to said position by reason of the sliding engagement between rod 75 and lever 69.

In the operation of the mechanism, the car at stand-still and with the ignition switch 110 closed and the engine idling will cause the solenoid H to be energized as in Fig. 13 because governor switch 103 is closed thereby establishing the governor solenoid circuit. Cylinder 80 is vented and sleeve F disengaged. The driver shifts sleeve 42 to either the high or low range and accelerates the car ordinarily above the critical speed of governor J thereby causing switch 103 to open. As vacuum builds up in the engine intake manifold K, plunger 87 now being lowered by spring 90 because switch 103 is open, piston 72 will be operated by vacuum thereby moving rod 74 to its Fig. 14 latched position. As soon as the driver allows the engine to coast, sleeve F will engage teeth 49 synchronously, to step-up the drive to either second or fourth although the step-up will be delayed until engine coast thereby enabling drive in the slower driving ratio of first or third as long as desired.

If the car is initially accelerated in first above the governor critical speed and the engine allowed to coast, then second will automatically become operative. Then if the driver shifts sleeve 42 forwardly to the high range, third will of course be skipped and fourth will be obtained because sleeve F will remain engaged. Ordinarily, especially where the car is equipped with a fluid coupling B, the sleeve 42 may be left in its high range and all starts and stops made without further shifting. This is possible owing to slippage in the fluid coupling when stopping the car for a traffic light and is practicable because the fluid coupling allows high engine torque for favorable car acceleration and because governor J directs a downshift on bringing the car to rest. Thus there is automatically provided a favorable torque-multiplying gearing for starting, as in third.

Whenever the car is driving in fourth or second above the governor critical speed, a full depression of the accelerator pedal will cause the transmission to step-down to third or first, the transmission step-up back to fourth or second taking place on release of the accelerator pedal with attendant synchronization of sleeve F with teeth 49.

When the accelerator pedal is fully depressed for the kick-down, switch 120 closes thereby energizing the kick-down solenoid circuit and causing solenoid H to raise plunger 87 and release latch 79 thereby venting chamber 80. At this time the sleeve F is under driving torque from the engine operating under wide open throttle. However, when latch 79 is released, spring 73 operates rod 75 forwardly sufficiently to close gap 82 thereby closing the interrupter switch 83 and grounding the engine ignition system. This relieves the torque at sleeve F and spring 73 then operates to release the sleeve whereupon the ignition is restored at detent 76 and the engine quickly speeds up to engage over-running clutch E for establishing the third or first driving ratio depending on the setting of sleeve 42 prior to the kick-down operation.

On bringing the car to a stop when sleeve F is clutched as in fourth for example, the governor J will direct a step-down shift in the transmission by closing governor switch 103 and establishing the governor solenoid circuit to vent chamber 80 and allow spring 73 to release sleeve F. This assures acceleration of the car in third, assuming clutch 42 is left in its forward position of shift, with automatic step-up to fourth upon release of the accelerator pedal above the speed at which governor switch 103 opens.

For sustained drive in second or fourth independent of motor G, the driver pulls knob 146 to swing lever 142 about pivot 141 thereby misaligning rod 75 and lever 66 whereupon spring 68 is free to shift sleeve F forwardly to its clutching position. Release of knob 146 will restore sleeve F to control of motor G.

I claim:

1. In a power transmission for driving a motor vehicle having an engine; a speed ratio varying transmission comprising change speed means operable to provide step-up and step-down change in the speed ratio drive from the engine to the vehicle and including a shift lever; a motor for controlling operation of said shift lever; means for mounting said shift lever so as to accommodate operation thereof in a predetermined path under control of said motor whereby to effect a predetermined change in said speed ratio drive, and for movement of said lever to and in a second path outside said predetermined path and control of said motor to effect said predetermined change in drive; and means for effecting movement of said shift lever from each of said relationships to the other.

2. In a power transmission for driving a motor vehicle having an engine; a speed ratio varying transmission comprising change speed means operable to provide step-up and step-down change in the speed ratio drive from the engine to the vehicle including a shift lever; a motor for controlling operation thereof; means for mounting said shift lever so as to accommodate operation thereof in a predetermined path under control of said motor whereby to effect a predetermined change in said speed ratio drive, and for movement of said lever to and in a second path outside said predetermined path and control of said motor to effect said predetermined change in drive, a spring yieldingly holding said shift lever in its said predetermined path and means operable under control of the vehicle driver for moving said shift lever from its said predetermined path to its said second path.

3. In a power transmission for driving a motor vehicle having an engine; a speed ratio varying transmission comprising change speed means operable to provide step-up and step-down change in the speed ratio drive from the engine to the vehicle including a shift lever; a motor adapted to be positioned in operating relationship with respect to said change speed mechanism for controlling operation thereof; means for mounting said shift lever so as to accommodate operation thereof in a predetermined path under operating control of said motor to effect a predetermined change in said speed ratio drive, and for movement of said lever to and in a second path outside said predetermined path and control of said motor to effect said predetermined drive change, means for effecting movement of said shift lever from each of said paths to the other, and means operable upon said lever when said lever is moved to its said second path for effecting said predetermined change in drive.

4. In a power transmission for driving a motor vehicle having an engine; a speed ratio varying transmission comprising change speed means operable to provide step-up and step-down change in the speed ratio drive from the engine to the vehicle including a shift lever; a vacuum motor for controlling operation of said lever; means for mounting said shift lever with respect to said vacuum motor so as to accommodate operation thereof in a predetermined change in said speed ratio drive, and for movement of said lever in a second path outside said predetermined path and control of said motor to effect said predetermined change in drive; and means for effecting movement of said shift lever from each of said positions to the other.

5. In a power transmission for driving a motor vehicle having an engine; a speed ratio varying transmission comprising change speed means operable to provide step-up and step-down change in the speed ratio drive from the engine to the vehicle including a shift lever; a motor for controlling operation thereof; said transmission having a casing; means for mounting said shift lever on said transmission casing so as to accommodate operation of said lever under control of said motor in one position to effect a predetermined change in said speed ratio drive and for swinging movement thereof relative to said transmission casing to a second position out of control of said motor whereby said predetermined drive change may also be effected and means for effecting said swinging movement of said lever from each of said positions to the other.

6. In a power transmission for driving a motor vehicle having an engine; a speed ratio varying transmission comprising change speed means operable to provide step-up and step-down change in the speed ratio drive from the engine to the vehicle, said change speed means comprising a follower operating element adapted for operation to change said speed ratio drive; a motor comprising a leader operating element carried thereby and adapted to control operation of said follower element to effect a drive change; means for mounting said follower element for swinging movement from a first position thereof to a second position in either of which the said drive change may be effected by said follower element; said leader element being disposed in operating relationship with respect to said follower element when said follower element is disposed in its said first position and out of said operating relationship when said follower element is disposed in its said second position; and means for effecting said swinging movement of said follower element.

7. In a power transmission for driving a motor vehicle having an engine; a speed ratio varying transmission comprising change speed means operable to provide step-up and step-down change in the speed ratio drive from the engine to the vehicle, said change speed means comprising a follower operating element adapted for operation to change said speed ratio drive; a vacuum motor comprising a leader operating element carried thereby and adapted to operate said follower element; means for mounting said follower element for operation in a predetermined path to effect a predetermined change in the speed ratio drive and for swinging movement from said path to a second path wherein operation of said follower element may also effect said predetermined change, said leader element being disposed in operating relationship with respect to said follower element when said follower element is disposed in its said first path and out of said operating relationship when said follower element is disposed in its said second path; and means for effecting said swinging movement of said follower element.

8. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive; a follower member having a thrust-receiving portion operably connected to said shiftable element; a leader member having a thrust-imparting portion adapted to transmit thrust to the thrust-receiving portion of said follower member; a vacuum motor for operating said leader member; means for mounting said follower element for swinging movement thereof for selectively establishing either an operative or an inoperative thrust-transmitting relationship between said leader and follower portions; said motor comprising thrust-applying means for said leader member operable, when said operative thrust-transmitting relationship is established, to cause thrust of said follower member so as to shift said shiftable element out of said engagement; means for imparting said swinging movement to said follower element thereby to establish said inoperative thrust-transmitting relationship; and means yieldingly acting on said shiftable element for effecting said engaging shift thereof after said inoperative thrust-transmitting relationship is established.

9. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive; motor means comprising a leader member operable to control said shift of said shiftable element and adapted for movement between operative and released positions thereof respectively corresponding to engagement and disengagement of said shiftable element as aforesaid; spring means yieldingly urging said leader member to its said released position; means comprising a follower member operably connected with said shiftable element; second spring means acting with less force than the first said spring means to urge said engagement of said shiftable element; means for mounting said follower member means for movement thereof relative to said leader member; means operable under control of the vehicle driver for effecting movement of said follower member means on its said mounting means so as to provide either an operative relationship between said leader and follower member means such that movement of said leader member to its said released position by the first said spring means will operate said follower member means in opposition to said second spring means to cause said disengagement of said shiftable element, or an inoperative relationship between said leader and follower member means such that with said leader member remaining in its said released position engaging shift of said shiftable element by said second spring means is accommodated; and means for controlling operation of said motor means.

10. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive when torque transmission between said drive control elements is diminished; motor means comprising a leader member operable to control said shift of said shiftable element and adapted for movement between operative and released positions thereof respectively corresponding to engagement and disengagement of said shiftable element as aforesaid; spring means yieldingly urging said leader member to its said released position; releasable holding means operable to releasably hold said leader member in its said operative position and adapted when released to accommodate movement of said leader member to its said released position by said spring means; means comprising a follower member operably connected with said shiftable element; second spring means acting with less force than the first said spring means to urge said engagement of said shiftable element; means for mounting said follower element for movement thereof relative to said leader member; means operable under control of the vehicle driver for effecting movement of said follower element on its said mounting means so as to provide either an operative relationship between said leader and follower members such that movement of said leader member to its said released position by the first said spring means will operate said follower member in opposition to said second spring means to cause said disengagement of said shiftable element, or an inoperative relationship between said leader and follower members such that with said leader member remaining in its said released position engaging shift of said shiftable element by said second spring means is accommodated; a vehicle drive control element adapted for manipulation by the vehicle driver; and means operable in response to driver manipulation of said control element for controlling operation of said holding means and effecting momentary diminution of said torque transmission.

11. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive when torque transmission between said drive control elements is diminished; motor means comprising a leader member operable to control said shift of said shiftable element and adapted for movement between operative and released positions thereof respectively corresponding to engagement and disengagement of said shiftable element as aforesaid; spring means yieldingly urging said leader member to its said released position; means comprising a follower member operably connected with said shiftable element; second spring means acting with less force than the first said spring means to urge said engagement of said shiftable element; means for mounting said follower member for movement thereof relative to said leader member; means operable under control of the vehicle driver for effecting movement of said follower member on its said mounting means so as to provide either an operative relationship between said leader and follower members such that movement of said leader member to its said released position by the first said spring means will operate said follower member in opposition to said second spring means to cause said disengagement of said shiftable element, or an inoperative relationship between said leader and follower members such that with said leader member remaining in its said released position engaging shift of said shiftable element by said second spring means is accommodated; and vehicle speed responsive means for controlling operation of said motor means and effecting momentary diminution of said torque transmission.

12. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive; a follower member having a thrust-receiving portion, operably connected to said shiftable element; a leader member having a thrust-imparting portion adapted to transmit thrust to the thrust-receiving portion of said follower member; a vacuum motor for operating said leader member; means for mounting said follower member for swinging movement thereof for selectively establishing either an operative or an inoperative thrust-transmitting relationship between said leader and follower portions; said motor comprising thrust-applying means for said leader member operable, when said operative thrust-transmitting relationship is established, to cause thrust of said follower member so as to shift said shiftable element out of said engagement; means for imparting said swinging movement to said follower member thereby to establish said inoperative thrust-transmitting relationship; means yieldingly acting on said shiftable element for effecting said engaging shift thereof after said inoperative thrust-transmitting relationship is established; vacuum means operable to retract said leader member in lost motion relationship with respect to said follower member such that on venting said vacuum means, said thrust-applying means will move said leader member relative to said follower member in taking up said lost motion until said thrust-transmitting relationship is established; and means for varying torque transmission between said drive control elements in response to said movement of said leader member relative to said follower member.

13. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including positively engageable drive control elements one of which is shiftable into engagement with the other to establish said speed ratio drive and out of engagement with said other drive control element to release said speed ratio drive; a shift lever having a thrust-receiving portion operably connected to said shiftable element; a leader member having a thrust-imparting portion adapted to transmit thrust to the thrust-receiving portion of said shift lever; a vacuum motor for operating said leader member; means for mounting said shift lever for swinging movement thereof for selectively establishing either an operative or an inoperative thrust-transmitting relationship between said leader member and shift lever said motor comprising thrust-applying means for said leader member operable, when said operative thrust-transmitting relationship is established, to cause thrust of said follower member so as to shift said shiftable element out of said engagement; means for imparting said swinging movement to said shift lever thereby to establish said inoperative thrust-transmitting relationship; means yieldingly acting on said shift lever for effecting said engaging shift thereof when said inoperative thrust-transmitting relationship is established; said motor comprising vacuum means operable to retract said leader member in lost motion relationship with respect to said shift lever such that on venting said vacuum means, said thrust-applying means will move said leader member relative to said shift lever in taking up said lost motion until said thrust-transmitting relationship is established; means for varying torque transmission between said drive control elements in response to said movement of said leader member relative to said shift lever; means operable to releasably hold said leader member when the latter is retracted as aforesaid; and vehicle speed responsive means for controlling operation of said holding means.

14. In combination with a vehicle transmission having a shift lever, a motor having a thrust member adapted for operative engagement with said lever; a spring for operating said lever when said thrust member is out of engagement therewith; means pivotally mounting said lever for swinging out of the path of said thrust member; a spring for urging said lever into the path of said thrust member; a second pivotally mounted lever adapted to be swung into engagement with said first lever thereby to swing the same out of said path, and driver actuated means for swinging said second lever.

15. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including a drive control element to establish said speed ratio drive and to release said speed ratio drive; motor means comprising a leader member operable to control said shift of said shiftable element and adapted for movement between operative and released positions thereof respectively corresponding to engagement and disengagement of said shiftable element as aforesaid; spring means yieldingly urging said leader member to its said released position; means comprising a follower member operably connected with said shiftable element; second spring means acting with less force than the first said spring means to urge said engagement of said shiftable element; means for mounting said follower member for movement thereof relative to said leader member; and means operable under control of the vehicle driver for effecting movement of said follower member on its said mounting means so as to provide either an operative relationship between said leader and follower members such that movement of said leader member to its said released position by the first said spring means will operate said follower member in opposition to said second spring means to cause said disengagement of said shiftable element, or an inoperative relationship between said leader and follower members such that with said leader member remaining in its said released position engaging shift of said shiftable element by said second spring means is accommodated.

16. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including a drive control element to establish and release said speed ratio drive; motor means operable to control drive-establishing and drive-releasing movement of said movable drive control element, said motor means comprising a leader part movable from a first position to a second position to accommodate drive-establishing movement of said movable drive control element; a first spring yieldingly urging said leader part to its said first position; a follower part operably connected to said movable drive control element and adapted for movement from a first position to a second position for imparting drive-releasing movement to said movable drive control element; a second spring acting with less force than the said first spring to yieldingly urge said follower part to its said first position; means for mounting said follower part for movement thereof relative to said leader part; and means operable under control of the vehicle driver for effecting movement of said follower part on its said mounting means so as to provide either an operative relationship between said leader and follower parts such that upon movement of said leader part from its said second position to its first position by the said first spring will operate through said follower part to move the latter from its said first position to its second position in opposition to said second spring, or an inoperative relationship between said leader and follower parts such that movement of said follower part from its said second position to its first position by said second spring may be accommodated while said leader part remains in its said first position.

17. In a motor vehicle power transmission having an engine; a driving structure adapted to receive drive from the engine; a driven structure adapted to receive drive from the driving structure for driving the vehicle; means operable to establish a speed ratio drive relationship between the driving and driven structures and including a movable drive control element to establish and release said speed ratio drive; a pressure fluid motor operable to control drive-establishing and drive-releasing movement of said movable drive control element, said motor comprising a piston operable by pressure fluid from a first position to a second position thereof; a spring yieldingly urging said piston to its said first position; piston operated means for transmitting movement from said piston to said movable drive control element and adapted for movement from a first position to a second position for imparting drive-releasing movement to said movable drive control element; yielding means operating to urge drive-establishing movement of said movable drive control element when said piston is operated by pressure fluid and so constructed and arranged as to accommodate pressure fluid operation of said piston in advance of drive-establishing movement of said movable drive control element; means for mounting said drive control element for swinging movement; and manually controlled means operable by the vehicle driver for imparting swinging movement to said element relative to said piston operated means thereby to accommodate drive-establishing movement thereof by said yielding means independently of pressure fluid operation of said piston.

18. In a motor vehicle power transmission having an engine; a driving structure adapted to receive drive from the engine, a driven structure adapted to receive drive from the driving structure for driving the vehicle, means operable to establish a speed ratio drive relationship between the driving and driven structures and including a drive control element to establish said speed ratio drive and to release said speed ratio drive, a shift lever operably connected with said drive control element, means mounting said lever for movement in a plurality of paths, resilient means for actuating said lever to establish said drive, a motor including means operable thereby along one of said lever paths in juxtaposition to said lever for controlling shift of said element by said lever between drive establishing and drive releasing positions, and means operable to position said shift lever for movement in a second of its permissible paths of movement under conditions when said drive control element has established drive release under control of said motor, whereby said drive control element may be actuated by said lever through said resilient means to establish said drive free of control of said motor.

19. In a motor vehicle power transmission having an engine, a driving structure adapted to receive drive from the engine, a driven structure adapted to receive drive from the driving structure for driving the vehicle, means operable to establish a speed ratio drive relationship between the driving and driven structures and including positively engageable drive control elements one of which is shiftable into engagement with the other to establish said speed ratio drive and out of engagement with said other drive control element to release said speed ratio drive; a pivoted shift lever operably connected with said shiftable control element, spring means for urging operation of said lever to establish said speed ratio drive, a motor for controlling shift of said shiftable control element by said lever in response to a predetermined drive of said vehicle and including means for operative engagement with the said lever along a predetermined path, means mounting said shift lever for movement to a position outside of said path of operative engagement therewith of said motor means, driver actuated means including a member for engaging said shift lever substantially on its pivotal axis to move said shift lever outside said path whereby to allow said spring means to operate said lever to establish said speed ratio drive independent of said motor control, and means for returning said shift lever to its position of operative relationship with said motor means.

20. In combination with a vehicle transmission having a shift lever, a motor having a thrust member adapted for operative engagement with said lever, a spring for operating said lever when said thrust member is out of the path of engagement with said lever, means pivotally mounting said lever for swinging movement out of the path of said thrust member, a spring for urging said lever into the path of said thrust member, a second pivotally mounted lever including means to be swung into engagement with said first lever along the pivotal axes of said first lever whereby to swing said first lever out of said path, and means under control of the vehicle driver for actuating said second lever.

TENO IAVELLI.